(12) United States Patent
Ohkubo et al.

(10) Patent No.: US 7,921,743 B2
(45) Date of Patent: Apr. 12, 2011

(54) BALL SCREW DEVICE

(75) Inventors: Tsutomu Ohkubo, Kanagawa (JP); Atsushi Minakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 750 days.

(21) Appl. No.: 11/197,522

(22) Filed: Aug. 5, 2005

(65) Prior Publication Data

US 2006/0027038 A1   Feb. 9, 2006

(30) Foreign Application Priority Data

Aug. 5, 2004  (JP) .............................. P.2004-229605

(51) Int. Cl.
*F16H 25/22*  (2006.01)

(52) U.S. Cl. .................................. 74/424.87; 74/424.88

(58) Field of Classification Search ... 74/424.81–424.88
See application file for complete search history.

(56) References Cited

U.S. PATENT DOCUMENTS

| | | | |
|---|---|---|---|
| 5,063,809 A | | 11/1991 | Schlenker |
| 5,791,192 A | * | 8/1998 | Lee ............. 74/424.87 |
| 6,176,149 B1 | | 1/2001 | Misu |
| 6,681,651 B2 | | 1/2004 | Fujita |
| 6,769,324 B2 | * | 8/2004 | Kajita ............... 74/424.88 |
| 6,779,419 B2 | * | 8/2004 | Yamaguchi ......... 74/424.88 |
| 2002/0026844 A1 | * | 3/2002 | Fujita ............... 74/424.86 |
| 2002/0178852 A1 | * | 12/2002 | Yamaguchi ......... 74/424.88 |
| 2003/0172759 A1 | * | 9/2003 | Hayashi ............. 74/424.86 |
| 2003/0213323 A1 | * | 11/2003 | Hayashi ............. 74/424.87 |
| 2003/0221501 A1 | | 12/2003 | Ohkubo et al. |
| 2008/0134822 A1 | * | 6/2008 | Pan et al. ........... 74/424.87 |
| 2010/0050802 A1 | * | 3/2010 | Chen ................. 74/424.88 |
| 2010/0107794 A1 | * | 5/2010 | Lin et al. ............. 74/424.83 |

FOREIGN PATENT DOCUMENTS

| | | |
|---|---|---|
| CN | 1240891 A | 1/2000 |
| CN | 1423071 A | 6/2003 |
| EP | 1291555 A1 | 3/2003 |
| JP | 50-031257 A | 3/1975 |
| JP | 6-54953 U | 7/1994 |
| JP | 2002276764 A | 9/2002 |
| JP | 2003-269563 A | 9/2003 |
| JP | 2003-329102 A | 11/2003 |
| JP | 2003-343681 A | 12/2003 |
| JP | 2004-028192 A | 1/2004 |
| JP | 2004-156767 A | 6/2004 |

OTHER PUBLICATIONS

Office Action for corresponding Chinese Application No. 2005100910417 dated Nov. 23, 2007.
Extended European Search Report dated Aug. 14, 2009.
Japanese Office Action issued in Application No. 2004-177994, dated Jun. 15, 2010.
Japanese Office Action issued in Application No. 2004-177994, dated Sep. 7, 2010.

* cited by examiner

*Primary Examiner* — Richard W Ridley
*Assistant Examiner* — Terence Boes
(74) *Attorney, Agent, or Firm* — Sughrue Mion, PLLC

(57) ABSTRACT

A ball circulating member constructed in an external face of a nut is provided with ball scooping sections for scooping up balls rolling on between ball screw grooves of a screw shaft and the nut, along a line tangent to a center orbital circle of the balls. The path length of a ball scooping path section formed in the ball scooping sections is set to be ½ or greater of the diameter of the ball.

7 Claims, 6 Drawing Sheets

BALL SCREW DEVICE

BACKGROUND OF THE INVENTION

1. Technical Field

The present invention relates to a ball screw device for converting rotational motion into linear motion.

2. Related Art

In industrial machines such as a machine tool and an injection molding machine, a ball screw device of a tube circulation type as shown in FIG. 8 is used as a device for converting rotational motion into linear motion. The ball screw device comprises: a screw shaft 1; and a nut 2 having an inner periphery provided with a ball screw groove 4 opposing a ball screw groove 3 formed in the outer periphery of the screw shaft 1. Then, a large number of balls 6 serving as rolling elements are arranged in a ball load rolling path 5 formed between the ball screw groove 3 and the ball screw groove 4. These balls 6 roll on between the ball screw grooves 3 and 4 in association with the revolution of the screw shaft 1 or the nut 2. A flat part 2a formed in the outer periphery of the nut 2 is provided with a ball circulating tube 7 for circulating the balls 6. The ball circulating tube 7 is fabricated by bending into a U-shape a tube material composed of metal. The flat part 2a of the nut 2 is provided with two circulating tube insertion holes 8 into each of which an end of the ball circulating tube 7 is inserted. The ball circulating tube 7 has a tongue section at each end, so that the balls 6 rolling on between the ball screw grooves 3 and 4 are scooped up from the ball screw grooves 3 and 4 by the tongue section of the ball circulating tube 7.

In this ball screw device, the balls compete with each other in the ball load rolling path 5 formed between the ball screw grooves 3 and 4 and in the ball return path formed in the ball circulating tube 7. This jamming of the balls can cause rapid wear-out to the balls 6, or alternatively damage to the surface of the balls 6. Thus, in order to avoid the jamming of the balls, a device has been proposed in which ball retaining pieces 9 fabricated of resin are respectively arranged between the balls as shown in FIG. 9 (see Japanese Published Unexamined Patent Application No. 2003-269563 which is hereinafter referred as Patent Document 1).

Nevertheless, in the ball screw device described in the Patent Document 1 given above, when the filling factor of the ball retaining pieces becomes small in the ball circulation path, the ball retaining piece 9 can be temporarily caught at a step 10 or a gap 11 appearing near the outlet of the ball circulating tube 7 or alternatively at the tongue section 7a of the ball circulating tube 7, as shown in FIGS. 10A-10C. This causes trouble. In order that such temporary catch of the ball retaining piece should be avoided, the filling factor of the ball retaining pieces 9 need to be managed strictly at the time of fabrication. Alternatively, accuracy needs to be improved in the machining of the circulating tube insertion hole 8. Nevertheless, these approaches that the filling factor of the ball retaining pieces 9 is managed strictly at the time of fabrication, and that the accuracy is improved in the machining of the circulating tube insertion hole 8 cause a problem of a cost increase. The invention has been devised by focusing attention on this point.

SUMMARY OF THE INVENTION

An object of the invention is to provide a ball screw device free from the temporary catch of a ball retaining piece even when the filling factor of the ball retaining pieces is small in the ball circulation path.

In order to achieve the object described above, a first aspect of the invention is a ball screw device comprising: a screw shaft having an outer periphery provided with a ball screw groove; a nut having an inner periphery provided with a ball screw groove opposing the ball screw groove of the screw shaft; a large number of balls rolling on a ball load rolling path formed between the ball screw groove of said screw shaft and the ball screw groove of said nut, in association with revolution of said screw shaft or said nut; and a ball circulating member having a ball return path for circulating these balls, wherein resin-fabricated ball retaining pieces for suppressing jamming of said balls are respectively arranged between the balls, and wherein said ball circulating member is provided with a ball scooping section for scooping up the balls rolling on between said ball screw grooves, along a line tangent to a center orbital circle of the balls.

A second aspect of the invention is a ball screw device according to the first aspect, wherein said ball scooping section has a line-shaped ball scooping path section in a boundary part between said ball load rolling path and said ball return path, and wherein said ball scooping path section has a path length of ½ D or greater relative to a diameter D of said ball.

A third aspect of the invention is a ball screw device comprising: a screw shaft having an outer periphery provided with a ball screw groove; a nut having an inner periphery provided with a ball screw groove opposing the ball screw groove of the screw shaft; a large number of balls rolling on a ball load rolling path formed between the ball screw groove of said screw shaft and the ball screw groove of said nut, in association with revolution of said screw shaft or said nut; and a ball circulating tube having a ball return path for circulating these balls, wherein resin-fabricated ball retaining pieces for suppressing jamming of said balls are respectively arranged between the balls, and wherein a ball scooping path formed in a boundary part between said ball load rolling path and said ball return path has a length of ½ or greater of a diameter of said ball.

In the ball screw device according to the first aspect of the invention, a ball circulating member is provided with a ball scooping section for scooping up the balls rolling on between the ball screw grooves, along a line tangent to the center orbital circle of the balls. Thus, in the boundary part between the ball load rolling path and the ball return path, the balls and the ball retaining pieces align almost linearly along the line tangent to the ball center orbital circle. Accordingly, in contrast to the case of the tube circulation type ball screw device, the orientation of the ball retaining piece does not largely change in the boundary part between the ball load rolling path and the ball return path. This avoids the temporary catch of the ball retaining piece even when the filling factor of the ball retaining pieces is small in the ball circulation path.

In the ball screw device according to the second aspect of the invention, the path length of the ball scooping path section is set to be ½ D or greater relative to the diameter D of the ball. This avoids more reliably the temporary catch of the ball retaining piece even when the filling factor of the ball retaining pieces is small in the ball circulation path.

In the ball screw device according to the third aspect of the invention, the length of the ball scooping path formed in the boundary part between the ball load rolling path and the ball return path is set to be ½ or greater of the diameter of the ball. Thus, the discontinuous scooping section becomes distant from a portion where a step, a gap, or the like can arise. This avoids the temporary catch of the ball retaining piece even when the filling factor of the ball retaining pieces is small in the ball circulation path.

DETAILED DESCRIPTION OF THE INVENTION

Embodiments of the invention are described below with reference to the drawings.

Figure 1:
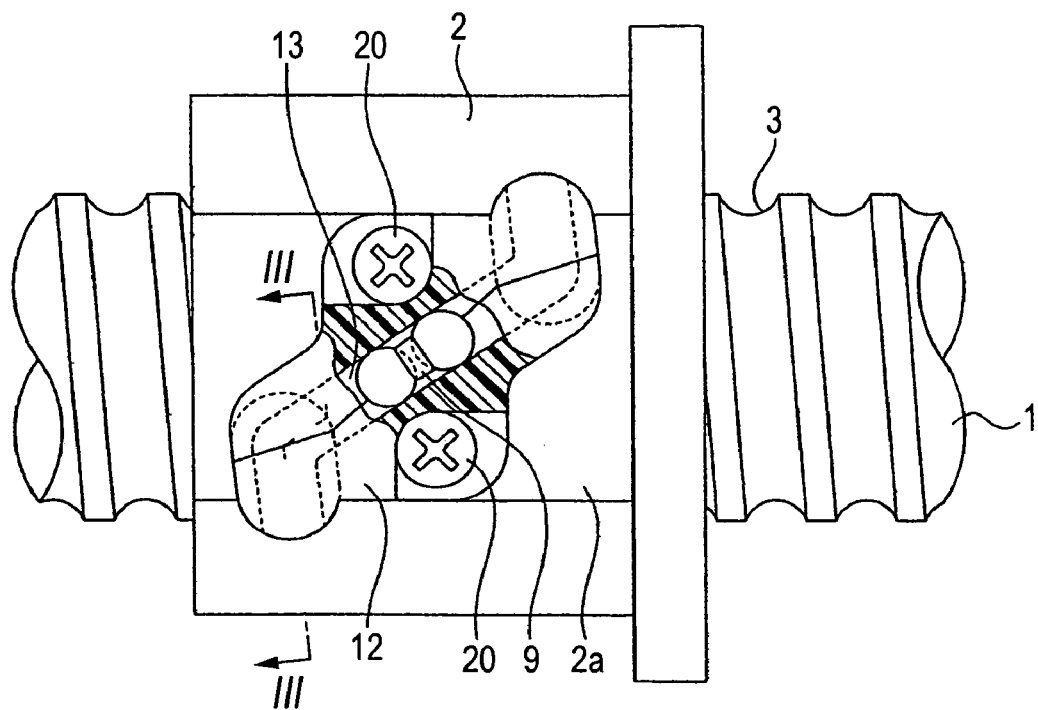
FIG. 1 is a plan view of a ball screw device according to a first embodiment of the invention.
Figure 2:
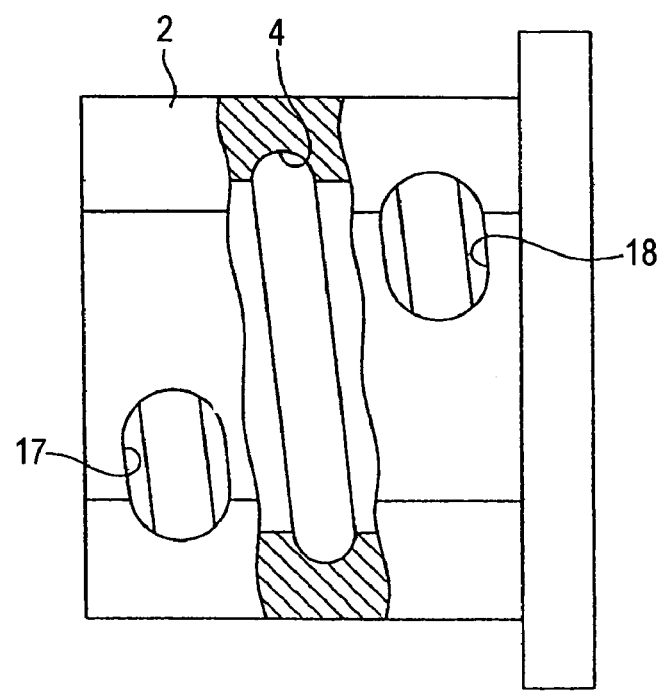
FIG. 2 is a plan view of a nut shown in FIG. 1.

FIGS. 1-5 show a ball screw device according to an embodiment of the invention. As shown in FIG. 1, the ball screw device according to an embodiment of the invention comprises a screw shaft 1 and a nut 2. A ball screw groove 3 is formed in the outer periphery of the screw shaft 1. The ball screw groove 3 opposes a ball screw groove 4 (see FIG. 2) formed in the inner periphery of the nut 2. A large number of balls 6 serving as rolling elements are arranged in a ball load rolling path 5 (see FIG. 3) formed between the ball screw groove 3 and the ball screw groove 4.

The balls 6 are arranged in line along the ball screw grooves 3 and 4. Ball retaining pieces 9 fabricated of resin for avoiding jamming of the balls are respectively provided between the balls 6. These balls 6 roll on the ball load rolling path 5 in association with the revolution of the screw shaft 1 or the nut 2. A flat part 2a formed in the outer periphery of the nut 2 is provided with a ball circulating member 12 fabricated of synthetic resin material.

Figure 3:
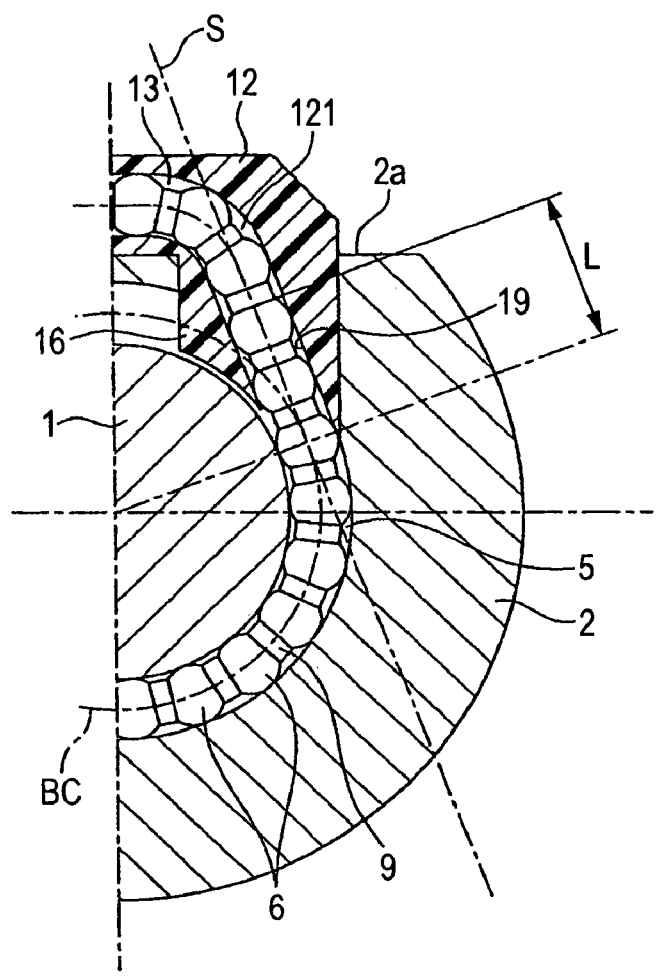
FIG. 3 is a III-III sectional view of FIG. 1.
Figure 4:
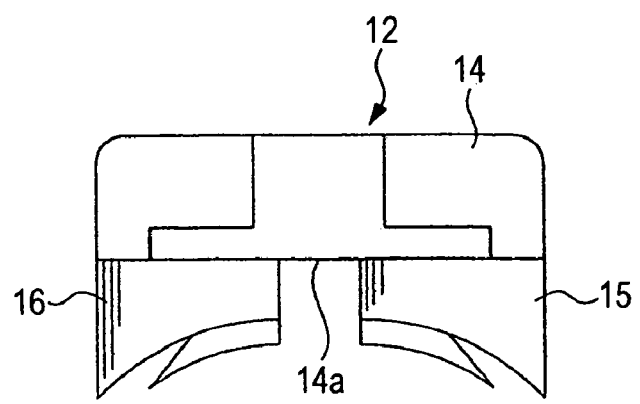
FIG. 4 is a front view of a ball circulating member shown in FIG. 1.
Figure 5:
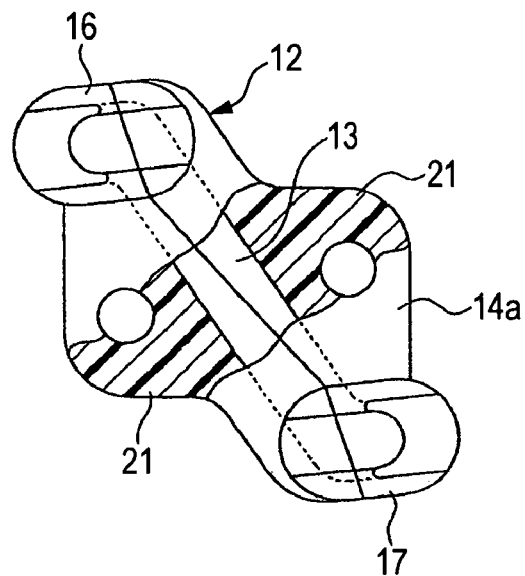
FIG. 5 is a bottom view of a ball circulating member shown in FIG. 1.

The ball circulating member 12 has a ball return path 13 (see FIG. 1) for circulating the balls 6 rolling on the ball load rolling path 5. Thus, the balls 6 having rolled through the ball load rolling path 5 are circulated through the ball return path 13 of the ball circulating member 12. As shown in FIGS. 3 and 4, the ball circulating member 12 comprises: a main body 14 having a fixing face 14a fixed to the flat part 2a of the nut 2; and column-shaped ball scooping sections 15 and 16 extending from the fixing face 14a of the main body 14 toward the flat part 2a of the nut 2. The flat part 2a of the nut 2 is provided with circulating member insertion holes 17 and 18 (see FIG. 2) fitted respectively with the ball scooping sections 15 and 16 of the ball circulating member 12. These circulating member insertion holes 17 and 18 are formed in the shape of an ellipse which are elongated along and parallel to a helix along which the ball screw groove 4 extends so as to avoid interference with the ball screw groove 4 formed in the inner periphery of the nut 2.

As shown in FIG. 3, in the ball scooping sections 15 and 16, a line-shaped ball scooping path section 19 for scooping up the balls 6 having rolled through the ball load rolling path 5, along a line S tangent to the center orbital circle BC of the balls 6 is provided in the boundary part between the ball load rolling path 5 and the ball return path 13. As shown in FIG. 3, the ball scooping path section 19 has a path length L greater than or equal to ½ D relative to the diameter D of the ball 6.

The ball circulating member 12 is fixed to the flat part 2a of the nut 2 with two screws 20 (see FIG. 1). The flat part 2a of the nut 2 is provided with two tapped holes (not shown) into which the screws 20 are inserted. The ball circulating member 12 is constructed from a pair of resin molded members 21 (see FIG. 5). Each resin molded member 21 is provided with a ball return path forming groove (not shown) for forming the ball return path 13. The ball circulating member 12 may be fixed to the nut 2 using a fixing component of the form of a metal cover.

In the ball screw device constructed as described here, the ball scooping sections 15 and 16 for scooping up the balls 6 rolling on between the ball screw grooves 3 and 4, along the line S tangent to the center orbital circle BC of the balls 6 have been provided in the ball circulating member 12. Thus, in the boundary part between the ball load rolling path 5 formed between the ball screw grooves 3 and 4 and the ball return path 13, the balls 6 and the ball retaining pieces 9 align almost linearly along the line S tangent to the center orbital circle BS of the balls 6. Thus, in contrast to the case of the tube circulation type ball screw device, the orientation of the ball retaining piece does not largely change in the boundary part between the ball load rolling path and the ball return path. This avoids the temporary catch of the ball retaining piece 9 even when the filling factor of the ball retaining pieces 9 is small in the circulation path for the balls 6. Accordingly, the necessity is avoided that the accuracy should be improved in the machining of the circulating member insertion holes 17 and 18 in order to avoid the temporary catch of the ball retaining piece 9. This avoids an increase in the machining cost.

Further, in the embodiment described above, the path length L of the ball scooping path section 19 has been set to be ½ D or greater relative to the diameter D of the ball 6. Thus, in the boundary part between the ball load rolling path 5 formed between the ball screw grooves 3 and 4 and the ball return path 13, the ball retaining pieces 9 align almost linearly along the line S tangent to the center orbital circle BS of the balls 6. This avoids more reliably the temporary catch of the ball retaining piece 9.

Further, the ball circulating member 12 has been fabricated from a synthetic resin material. Thus, in comparison with the case of a ball screw device employing a ball circulating member fabricated of metal, the occurrence of acoustic noise, vibration, and the like is suppressed. Furthermore, the circulating member insertion holes 17 and 18 have been formed in the shape of an ellipse which are elongated along and parallel to a helix along which the ball screw groove 4 extends. This reduces the possibility that the circulating member insertion holes 17 and 18 interfere with the ball screw groove 4, even when the diameter of the ball 6 is increased. As a result, the tangent scooping method described above is applicable even when the groove pitch is small in the ball screw groove, or alternatively even when the ball screw groove is replaced with multiple screw grooves.

Figure 6:
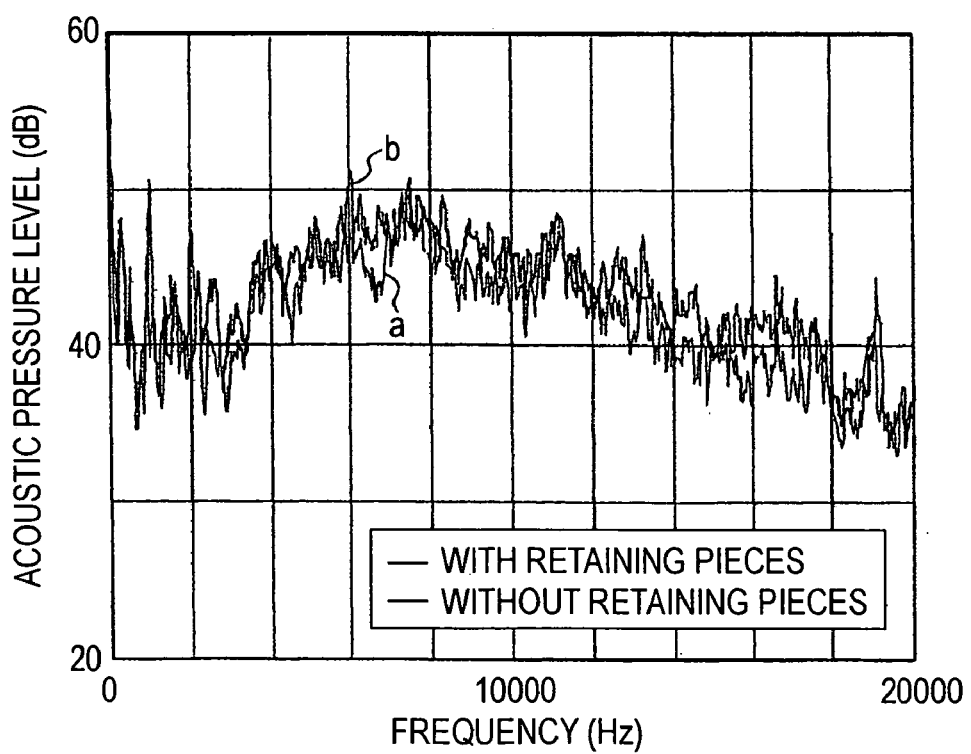
FIG. 6 is a diagram showing the result of frequency analysis of the acoustic noise characteristics of a ball screw device.

FIG. 6 shows a result of frequency analysis of the acoustic noise characteristics of a ball screw device having a shaft diameter of 25 mm and a ball diameter of 4.7625 mm in a case that the screw shaft of the ball screw device is revolved at a rate of 4000 min$^{-1}$. In the figure, line a indicates the result of frequency analysis of the acoustic noise characteristics obtained when the ball retaining pieces are arranged between the balls, while line b indicates the result of frequency analysis of the acoustic noise characteristics obtained when the ball retaining pieces are not arranged between the balls.

As seen from the result of frequency analysis of FIG. 6, when the ball retaining pieces are arranged between the balls, the acoustic noise level of the ball screw device is reduced, that is, a low acoustic noise effect is obtained, in comparison with the case that the ball retaining pieces are not arranged between the balls.

Figure 7:
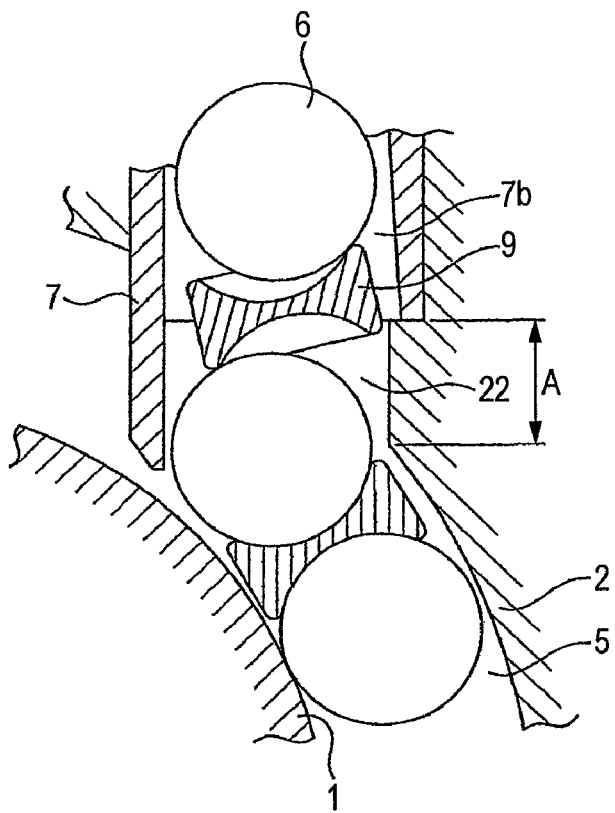
FIG. 7 is a sectional view showing the main part of a ball screw device according to a second embodiment of the invention.
Figure 8:
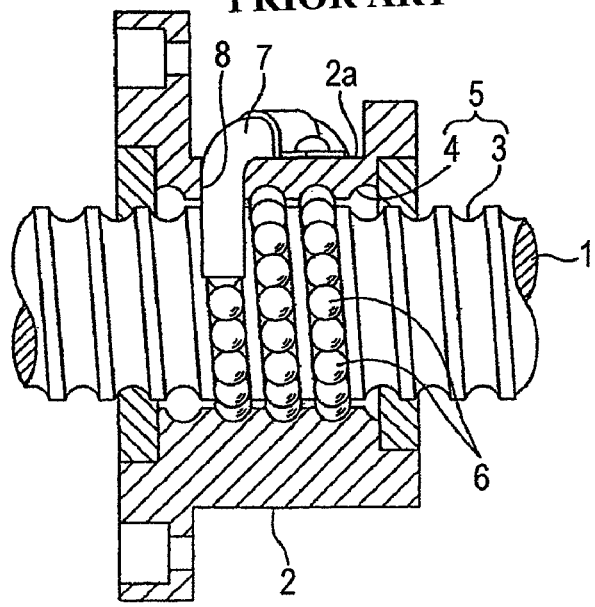
FIG. 8 is a sectional view of a tube circulation type ball screw device.
Figure 9:
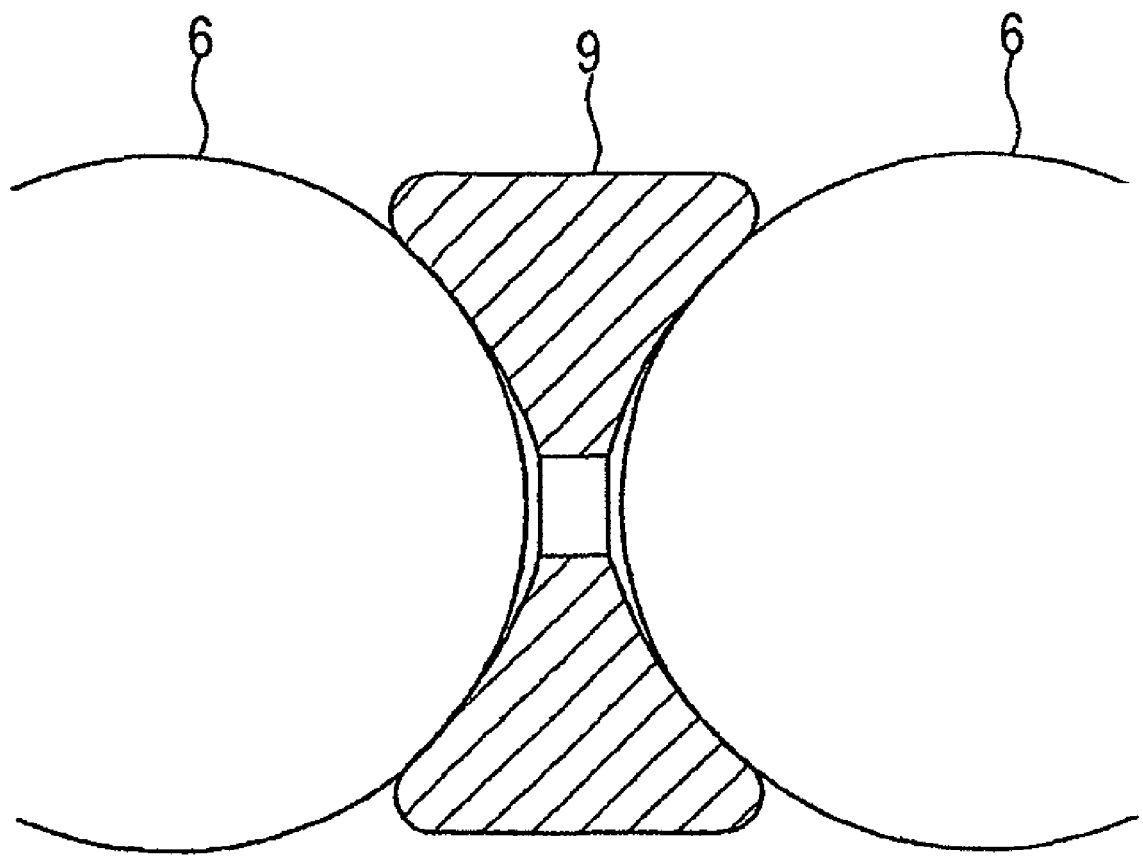
FIG. 9 is a sectional view of a ball retaining piece.
Figure 10C:
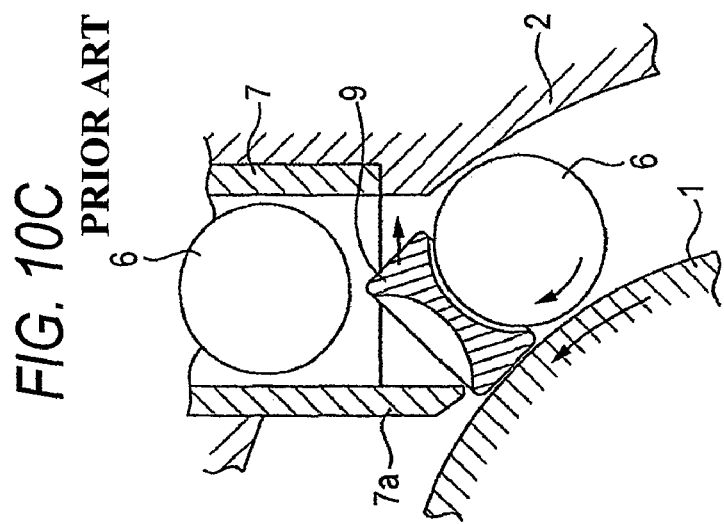
FIGS. 10A-10C are diagrams used for describing a problem in the related art.
Figure 10B:
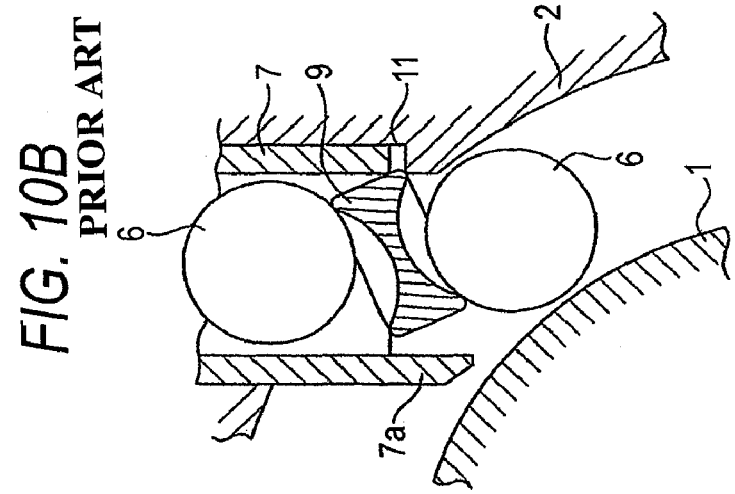
Figure 10A:
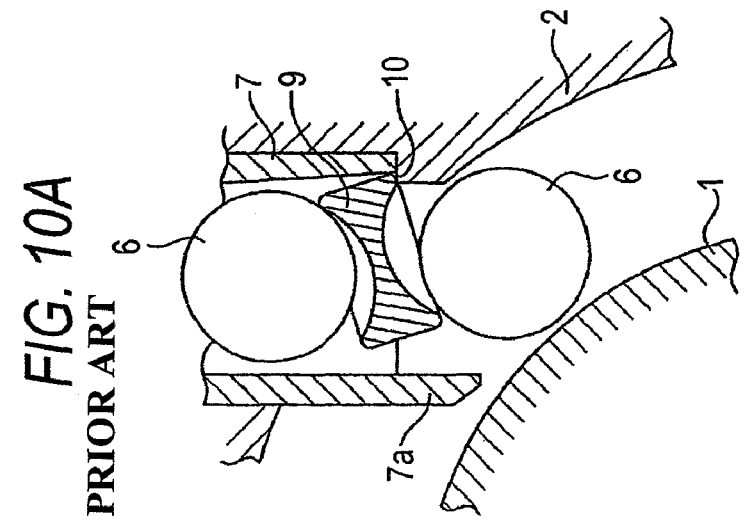

The invention is not limited to the embodiment described above. For example, the embodiment given above has been described for the case that the invention is applied to a ball screw device of a tangent method in which the balls are scooped up along a line tangent to the center orbital circle of the balls. However, in a second embodiment shown in FIG. 7 where the ball circulating member is composed of a ball circulating tube, a ball scooping path 22 formed in the boundary part between a ball return path 7b of the ball circulating tube 7 and a ball load rolling path 5 may have a length A greater than or equal to ½ of the diameter D of the balls 6. Also, in this case, an effect similar to that of the above-mentioned embodiment is obtained.

Further, the embodiment given above has been described for the case that the invention is applied to a ball screw device of an external circulation type where the balls are circulated in the outside of the nut. However, the invention is not limited to this. For example, the invention may be applied to a ball screw device of an internal circulation type where the balls are circulated in the inside of the nut.

We claim:

1. A ball screw device comprising:
   a screw shaft having an outer periphery provided with a ball screw groove;
   a nut having an inner periphery provided with a ball screw groove opposing the ball screw groove of the screw shaft;
   a large number of balls rolling on a ball load rolling path formed between the ball screw groove of the screw shaft and the ball screw groove of the nut, in association with revolution of the screw shaft or the nut;
   a ball circulating member having a ball return path for circulating these balls; and
   resin-fabricated ball retaining pieces for suppressing jamming of the balls are respectively arranged between the balls,
   wherein the ball circulating member further has a ball scooping section for scooping up the balls rolling between the ball screw grooves, along a line tangent to a center orbital circle of the balls,
   wherein the nut further has an outer periphery on which a flat part is formed,
   wherein when seen in an axial direction of the screw shaft, said line tangent to the center orbital circle of the balls is inclined with respect to the flat part,
   wherein the nut is formed with a circulating member insertion hole into which the ball scooping section is fitted,
   wherein the ball screw groove of the nut extends along a helix,
   wherein the circulating member insertion hole has an elliptic shape which is elongated along and parallel to the helix,
   wherein the circulating member insertion hole is configured such that, when seen in the axial direction, the circulating member insertion hole extends all the way through a wall of the nut from the outer periphery to the inner periphery of the nut, and such that, when seen in a direction perpendicular to the axial direction, the circulating member insertion hole has said elliptic shape;
   wherein the circulating member insertion hole is perpendicular to the flat part;
   wherein the ball scooping section is inserted into the circulating member insertion hole in a direction which is perpendicular to the flat part;
   wherein the circulating member insertion hole is defined by a surface of the nut which is provided around an entire outer perimeter of the circulating member insertion hole, and
   wherein all of the surface of the nut which defines the circulating member insertion hole extends perpendicularly to the flat part.

2. The ball screw device according to claim 1, wherein the ball scooping section has a line-shaped ball scooping path connecting the ball load rolling path and the ball return path, and wherein the ball scooping path has a path length of D/2 or greater relative to a diameter D of the ball.

3. The ball screw device according to claim 1, wherein the ball circulating member is fixed on the flat part.

4. The ball screw device according to claim 1, wherein, when seen in the axial direction of the screw shaft, said line tangent to the center orbital circle of the balls is inclined with respect to the circulating member insertion hole.

5. The ball screw device according to claim 1,
   wherein the ball screw groove of the nut has a lead angle, and
   wherein the ball scooping section scoops up the balls rolling between the ball screw grooves at an angle equal to the lead angle.

6. The ball screw device according to claim 1, wherein the ball circulating member is made of resin.

7. The ball screw device according to claim 1, wherein the ball circulating member is constructed from a pair of resin molded members which are attached together along the ball return path.

* * * * *